UNITED STATES PATENT OFFICE 2,237,979

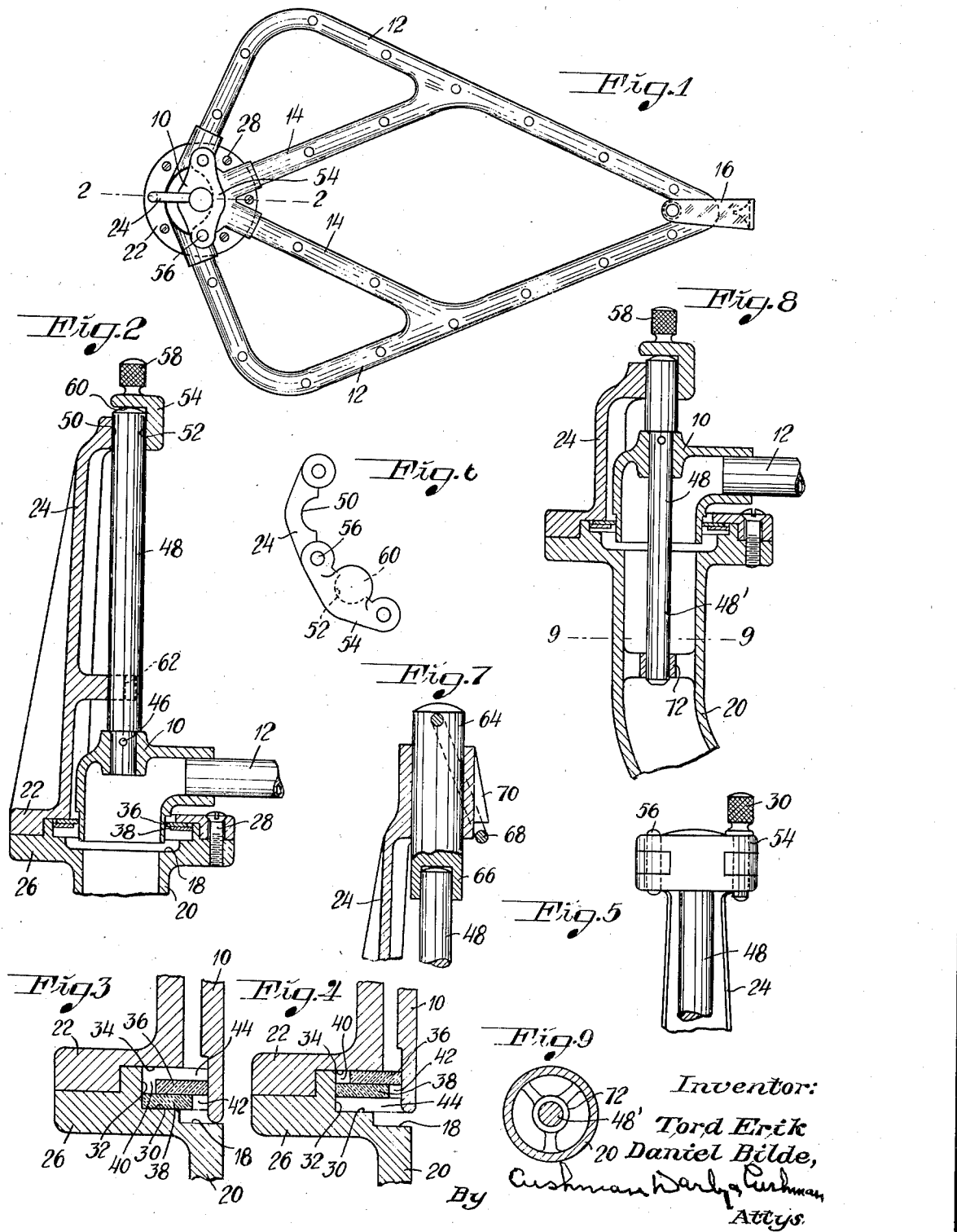

SPRAYING DEVICE FOR DISHWASHING MACHINES

Tord Erik Daniel Bilde, Ulvsunda, Sweden, assignor to Bolinder's Fabriks Aktiebolag, Stockholm, Sweden, a corporation of Sweden Application February 14, 1940, Serial No. 318,927
In Sweden June 29, 1938

3 Claims. (Cl. 299—71)

This application is a continuation-in-part of application Serial No. 280,202, filed June 20, 1939, and, as to common subject matter, relates back to said application Serial No. 280,202 for all dates and rights incident to the filing thereof and the filing of foreign applications corresponding thereto.

The present invention relates to dish washing machines of the type which are provided with a turnable or rotatable spray pipe for spraying the dishes with a liquid under pressure.

In dish washing machines of this type it was hitherto difficult to ensure a wholly safe operation on account of the necessity of paying regard simultaneously to the tightness of the connection between the spray pipe and the liquid supply pipe as well as to the mounting of the spray pipe. An unobstructed movability of the spray pipe could be attained only at the cost of the tightness and, on the other hand, the movability was reduced on increased effectivity of the packing due to increased friction. It might even happen that the spray pipe came to a standstill, for instance on account of foreign particles brought along by the passing liquid, such as a contaminated washing liquid, getting jammed between the sealing surfaces of the packing.

The principal object of the invention is to remove the above said drawbacks and to provide a spraying device for dish washing machines having a turnable or rotatable spray pipe in which the two functions—tightness and mounting—are filled by separate means. Thereby the packing means may be constructed with the sole object of obtaining a good tightness and the mounting means solely with regard to journalling, the mechanical stresses on the packing means being balanced and solely or at least in part taken up by the mounting means, permitting a simple structure and, above all, ensuring a wholly safe operation without any risk of interruptions and with good tightness and high movability of the spray pipe.

Another object of the invention is to provide a spraying device of the type described in which a bearing for the spray pipe is provided outside the packing means and arranged to guide the spray pipe in the plane of rotation thereof. The pressure created by the liquid pressure in the direction substantially perpendicular to the plane of rotation of the spray pipe may be taken up by any separate bearing part, but preferably said bearing is constructed to take up also this pressure.

A further object of the invention is to provide a spraying device of the type described permitting an easy removal of the spray pipe in order to permit a convenient cleansing thereof. For this purpose said bearing may be arranged outside a cylindrical part of the spray pipe which part is detachably connected to a liquid supply pipe by means of a suitable packing means, said bearing being capable of being opened in such manner as to permit the spray pipe to be removed from the packing means and the mounting means in the open position of said bearing.

A still further object of the invention is to provide a spraying device of the type described having a packing means between the spray pipe and a stationary supply pipe and a bearing arranged outside said packing means, said pipe being, except in said bearing which preferably is capable of being opened, guided at one or more additional guiding places provided outside the packing means. Said bearing and an additional guiding place may be provided either on the same side or on different sides of the packing means, for instance both of them above said means in which case the bearing is arranged above said additional guiding place, especially when it is desired to have the spray pipe easily removable, or the bearing may be arranged above and the additional guiding place below the packing means, the latter, for instance, within the liquid supply pipe.

Another object of the invention is to provide a packing means for a turnable or rotatable spray pipe in a dish washing machine ensuring a good tightness between the spray pipe and a stationary liquid supply pipe and simultaneously an unobstructive movability of the spray pipe and preventing foreign matter contained in the passing liquid from being jammed between the sealing surfaces of the packing and thereby reducing the movability of the spray pipe.

A further object of the invention is to provide a packing means for a rotatable spray pipe in a dish washing machine comprising one or more plane or substantially plane annular sheets or disks arranged between an outer cylindrical surface on the spray pipe and a similar surface co-axially therewith on a relatively fixed part, said disk or disks providing by one of their edge surfaces a sealing surface against the surface of one of the parts substantially in the direction of flow of the fluid and by one of its plane surfaces a sealing surface against the other part substantially perpendicular to said direction while forming at the other edge a clearance with the surface of the last-mentioned part. The clearance or clearances formed by the disk or disks divide the sealing surfaces into a plurality of small partial surfaces thus reducing the frictional engagement with the movable part to the advantage of an easy movability thereof, and further these clearances permit a certain adjustability of the disks in radial direction which further promotes said movability.

According to a preferred embodiment, the packing means comprises a plurality of annular plane or substantially plane disks piled onto each other and forming a disk packet, in which every other disk at its one edge bears tightly on the surface of the one part, for instance the fixed part, and at its other edge forms a clearance with the surface of the other part, for instance the spray pipe, and in which every other disk is arranged in opposite manner, that is at its one edge bears tightly on the surface of the spray pipe and at its other edge forms a clearance with the surface of the fixed part, the engagement of the disks with the surface of the movable part being such as to permit easy rotation of said part.

The disks may have the form of cylindrical rings arranged concentrically to the turning axis of the spray pipe and they may consist of metal, fibre, hard rubber, textile material, products of artificial resins such as the product registered by trade-mark Bakelite or the like.

The invention will be more fully described with reference to the accompanying drawing illustrating by way of example the invention as applied to a swingable spray pipe for a circulating washing liquid mounted for rotation in a fixed frame.

In the drawing:

Fig. 1 is a plan view of the spray pipe.

Fig. 2 is partial sectional view along the line 2—2 in Fig. 1 on a somewhat enlarged scale.

Figs. 3 and 4 are similar sectional views of the packing proper on a still enlarged scale showing the spray pipe and the packing means in two different positions.

Fig. 5 is a partial front elevation of Fig. 1.

Fig. 6 is a plan view of an upper bearing for the spray pipe in open position.

Fig. 7 is a partial view of Fig. 1 but with a bearing of another type.

Fig. 8 is a vertical sectional view of a further embodiment of the mounting means.

Fig. 9 is a sectional view along the line 9—9 in Fig. 8.

According to Fig. 1 the spray pipe comprises a substantially cylindrical inlet part or member 10 and perforated pipes 12 issuing from said part and forming substantially a trapezium as well as two perforated pipes 14 also issuing from the inlet part 10 and connected with the opposite sides of the trapezium. Provided at the outer corner of the trapezium is a reversing nozzle 16 of a type known per se by which on operation the spray pipe is swung to and fro in a horizontal plane.

In its resting position (see Fig. 3) the inlet part 10 of the spray pipe bears on an upper shoulder 18 of a stationary supply pipe 20 for liquid under pressure either from a water main or from a liquid forwarding pump. The inlet part 10 engages a lower cylindrical sleeve 22 of a bracket 24 which is secured to an upper flange 26 of pipe 20 by means of screws 28. The flange 26 has a peripheral recess (see Figs. 3 and 4) open at its top and confined by a plane or substantially plane horizontal surface 30 and a plane or substantially plane vertical lateral surface 32 concentric with the cylindrical outer surface of the inlet part 10. Together with a plane or substantially plane horizontal surface 34 of the sleeve 22 said recess forms an annular housing for a packing means.

This packing comprises a plurality of packing disks in the form of cylindrical rings. In the embodiment shown (see especially Figs. 3 and 4) there are provided two such rings 36, 38 but it should be observed that in certain cases only one ring may be sufficient, whereas in other cases more than two rings may be used. The upper ring 36 has an internal diameter equal or substantially equal to the external diameter of the inlet part 10 and an external diameter slightly less than the bottom diameter of the housing so as to form a clearance 40 with surface 32. The lower ring 38 has an external diameter equal or substantially equal to the diameter of the surface 32 and an internal diameter slightly greater than the external diameter of the inlet part 10 so as to form a clearance 42 with said pipe. Consequently, the packing rings have a tight fit against alternatingly the cylindrical surface of the movable inlet part 10 and the cylindrical surface 32 of the stationary supply pipe 20. On account of the clearances 40, 42 the rings 36, 38 obtain a certain adjustability in radial direction. Further, the total thickness of the two packing rings is less than the distance between the surfaces 30, 34 whereby an axial clearance 44 is formed giving the rings an adjustability also in axial direction as will be more fully described later on.

Rigidly connected with the inlet part 10 as by a pin 46 (see Fig. 2) is an upwardly projecting shaft 48 which is co-axial with the inlet part 10 and has a diameter less than that of said part. The shaft is mounted in the bracket 24 which at its upper end is formed to provide a semi-cylindrical bushing 50 (see also Fig. 6) of a bearing for the shaft, the other bushing 52 of said bearing being formed on a plate 54 turnably connected to the bracket 24 by a hinge 56 and lockable in operative position by means of a pin 58. In the embodiment shown this bearing is also constructed to take up upwardly acting pressure created by the liquid pressure, the plate 54 being formed to provide a bearing surface 60 for the upper end of the shaft 48 which end preferably is rounded off (see Fig. 2).

Except in the upper bearing 50, 52 the shaft 48 is also guided at an additional guiding place lying outside the packing means 36, 38 and the inlet part 10, the bracket 24 being provided with a further semi-cylindrical bushing 62. On account of the bearing pressure at this place acting uni-laterally in the direction towards the bearing bracket 24 such a semi-cylindrical bushing is sufficient for guiding the shaft, but, of course, it is possible to provide also at this place a whole-cylindrical bearing, for instance by the plate 54 being extended downwardly and formed to provide another semi-cylindrical bushing.

By providing the bearing surfaces of the spray pipe on the shaft 48, that is to say on a part having a diameter less than that of the inlet part 10 the bearing friction is reduced and space is saved. Further, it is also possible to make this bearing part of a material other than that of the spray pipe proper which is of advantage in several cases.

In resting position spray pipe and packing rings take up the position shown in Fig. 3, inlet part 10 bearing on the shoulder 18 of the supply pipe 20 and packing rings 36, 38 lying at the bottom of their housing. In this position a play exists between the upper end of shaft 48 and the bearing surface 60. Under the action of the flow of the liquid the spray pipe is pressed somewhat upwardly into the position shown in Figs. 2 and 4 which movement is limited by the upper end of shaft 48 abutting against the bearing surface 60. Under the action of the liquid pressure also the packing rings 36, 38 are displaced upwardly into the position shown in Figs. 2 and 4, the rings being pressed axially tightly onto each other and the upper ring 36 with one of its plane surfaces tightly onto surface 34 of bracket 24. Evidently the packing rings ensure axial tightness due to the contact of their edge surfaces with the co-axial cylindrical surfaces on the inlet part 10 and the supply pipe 20 as well as radial tightness due to the contact of the upper plane surface of ring 36 with surface 34 and of the rings with each other. As the sealing edge surface of ring 36 bearing on the cylindrical surface of the inlet part 10 is relatively small, the friction on said inlet part will be small, and, thus, the spray pipe will be easily movable in the packing which remains stationary. Said movability is increased by the adjustability of the rings in radial and axial direction without the tightness of the packing being thereby reduced. This easy movability of the spray pipe is not reduced by any foreign particle contained in the liquid entering between the sealing surfaces. If such a particle enters the packing it will practically immediately wedge its way between the inlet part 10 and the upper ring 36 to the other side of said ring from where it is carried away by the liquid.

When it is desired to remove the spray pipe for cleansing or other purpose pin 58 is removed and plate 54 swung outwardly, and then the spray pipe together with shaft 48 may be lifted out of the packing means 36, 38.

In the embodiment shown in Fig. 7 a pin 64 is loosely mounted at the upper end of bracket 24, said pin being at its lower end formed to provide a combined radial and axial bearing 66 for the shaft 48. A ring 68 is loosely mounted on pin 64 and co-operates with a projection 70 on bracket 24. In the figure the position of shaft 48 and pin 64 corresponds to resting position of the spray pipe, the upward movement of said pipe under the action of the flow of the liquid being limited by the engagement of ring 68 with the lower end of the projection 70.

In the embodiment according to Figs. 8 and 9 the additional guiding place for the spray pipe is arranged within the liquid supply pipe 20, a downwardly projecting part 48¹ of shaft 48 being guided in a ring 72 secured to said pipe. As before the bearing proper is disposed at a point of the shaft outside the inlet part 10 and formed in the same manner as in Figs. 1 to 6. This embodiment may be used, for instance, in such cases when the space above the spray pipe is small.

What I claim is:

1. A spraying device for dishwashing machines including a stationary supply pipe for spraying liquid under pressure, said pipe having a recess at one end, a movable spray member having inlet and outlet portions, the inlet portion being in alignment with said pipe and extending into said recess, spray means connected to said outlet portion, said recess having a shoulder upon which said inlet portion is arranged to rest, a displaceable disc packing in said recess through which said inlet portion extends, said packing being positioned to provide a liquid tight seal between the supply pipe and the spray member, and a bracket on said pipe adjacent the recess and extending above said spray member, said bracket having a shoulder co-acting with said recess to provide a housing for the packing, said spray member having a shaft projecting upwardly therefrom, said bracket comprising bearing means engaging said shaft to permit rotatable and axial movement of the spray member, said spray member normally resting on said pipe and arranged to be raised by the pressure of the liquid to expose the packing to the liquid pressure in order to move the packing tightly against the upper wall of the housing.

2. A spraying device for dishwashing machines including a stationary supply pipe for spraying liquid under pressure, said pipe having a recess at one end, a movable spay member having angularly disposed inlet and outlet portions, the inlet portion being in alignment with said pipe and extending into said recess, spray means connected to said outlet portion, said recess having a shoulder upon which said inlet portion is arranged to rest, a displaceable disc packing in said recess through which said inlet portion extends, said packing being positioned to provide a liquid tight seal between the supply pipe and the spray member, a bracket on said pipe adjacent the recess and extending above said spray member, said bracket having a shoulder co-acting with said recess to provide a housing for the packing, said spray member having a shaft projecting upwardly therefrom, said bracket comprising bearing means engaging said shaft to permit rotatable and axial movement of the spray member, said spray member normally resting on said pipe and arranged to be raised by the pressure of the liquid to expose the packing to the liquid pressure in order to move the packing tightly against the upper wall of the housing, and means for detachably connecting said shaft to said bracket.

3. A spraying device for dishwashing machines including a stationary supply pipe for spraying liquid under pressure, said pipe having a recess at one end, a movable spray member having angularly disposed inlet and outlet portions, the inlet portion being in alignment with said pipe and extending into said recess, spray means connected to said outlet portion, said recess having a shoulder upon which said inlet portion is arranged to rest, a displaceable disc packing in said recess through which said inlet portion extends, said packing being positioned to provide a liquid tight seal between the supply pipe and the spray member, a bracket on said pipe adjacent the recess and extending above said spray member, said bracket having a shoulder coacting with said recess to provide a housing for the packing, said spray member having a shaft projecting upwardly therefrom, said bracket comprising bearing means engaging said shaft to permit rotatable and axial movement of the spray member, said spray member normally resting on said pipe and arranged to be raised by the pressure of the liquid to expose the packing to the liquid pressure in order to move the packing tightly against the upper wall of the housing, said bracket having an opening in the upper end thereof, a slidable member in said opening and aligned with said shaft to constitute a bearing for the latter, and locking means on said slidable member co-acting with complementary means of said bracket for detachably securing the spray member in position.

TORD ERIK DANIEL BILDE.